United States Patent
Duffy, III et al.

(10) Patent No.: US 9,274,508 B2
(45) Date of Patent: *Mar. 1, 2016

(54) PRISMATIC LOCK AND KEY SECURITY

(71) Applicant: LENOVO ENTERPRISE SOLUTIONS (SINGAPORE) PTE. LTD., Singapore (SG)

(72) Inventors: William R. Duffy, III, Raleigh, NC (US); Phillip D. Jones, Raleigh, NC (US); Michael K. Trivette, Cary, NC (US); David T. Windell, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 210 days.

This patent is subject to a terminal disclaimer.

(21) Appl. No.: 13/846,141

(22) Filed: Mar. 18, 2013

(65) Prior Publication Data

US 2013/0214897 A1 Aug. 22, 2013

Related U.S. Application Data

(63) Continuation of application No. 12/247,700, filed on Oct. 8, 2008, now Pat. No. 8,462,322.

(51) Int. Cl.
*G06K 5/00* (2006.01)
*G05B 19/00* (2006.01)
(Continued)

(52) U.S. Cl.
CPC .............. *G05B 1/00* (2013.01); *G07C 9/00182* (2013.01); *G06K 7/10* (2013.01); *G06K 2019/0629* (2013.01); *G07C 2009/00785* (2013.01); *Y10T 70/10* (2015.04)

(58) Field of Classification Search
CPC ................... G07C 9/00182; G07C 2009/0019; G06K 7/10; G06K 19/06112; G06K 2019/0629
USPC .......... 356/71; 235/382; 359/2; 340/5.6–5.74
See application file for complete search history.

(56) References Cited

U.S. PATENT DOCUMENTS 3,735,374 A 5/1973 Rembault
4,697,171 A 9/1987 Suh
(Continued)

FOREIGN PATENT DOCUMENTS

JP 2000-220331 8/2000
KR 1999-13999 4/1999

OTHER PUBLICATIONS

Office Action, U.S. Appl. No. 12/247,700, Jan. 11, 2011, pp. 1-12.
(Continued)

*Primary Examiner* — Kara E Geisel
*Assistant Examiner* — Rebecca C Bryant
(74) *Attorney, Agent, or Firm* — Edward J. Lenart; Katherine S. Brown; Kennedy Lenart Spraggins LLP

(57) ABSTRACT

Methods and apparatus for lock and key security, the lock including a light receptacle, a scatter pattern detecting module, and a locking mechanism, the key including a light source and a prism, the lock and key security including receiving, in the light receptacle of the lock, light transmitted by the light source in the key through the prism; identifying, by the scatter pattern detecting module, a scatter pattern of the received light; comparing, by the scatter pattern detecting module, the scatter pattern to a unique preauthorized pattern for operating the lock; if the scatter pattern matches the unique preauthorized pattern, switching, by the scatter pattern detecting module, the current locking state of the locking mechanism; and if the scatter pattern does not match the unique preauthorized pattern, maintaining the current locking state of the locking mechanism.

13 Claims, 4 Drawing Sheets

(51) Int. Cl.
  *G05B 1/00* (2006.01)
  *G07C 9/00* (2006.01)
  *G06K 19/06* (2006.01)
  *G06K 7/10* (2006.01)

(56) References Cited

U.S. PATENT DOCUMENTS

| | | |
|---|---|---|
| 5,043,593 A | 8/1991 | Tsutsumi et al. |
| 5,283,431 A | 2/1994 | Rhine |
| 5,465,084 A | 11/1995 | Cottrell |
| 5,543,665 A | 8/1996 | Demarco |
| 5,629,764 A | 5/1997 | Bahuguna et al. |
| 5,745,045 A | 4/1998 | Kulha et al. |
| 6,744,909 B1 | 6/2004 | Kostrzewski et al. |
| 6,879,242 B1 | 4/2005 | Alon |
| 7,138,903 B2 | 11/2006 | Doong et al. |
| 7,224,528 B2 | 5/2007 | Phillips et al. |
| 2004/0182923 A1 | 9/2004 | Bench et al. |
| 2004/0185232 A1 | 9/2004 | Lawrence et al. |
| 2010/0085562 A1 | 4/2010 | Duffy, III et al. |

OTHER PUBLICATIONS

Notice of Allowance, U.S. Appl. No. 12/247,700, Jun. 27, 2011, pp. 1-7.
Notice of Allowance, U.S. Appl. No. 12/247,700, Feb. 7, 2013, pp. 1-8.

PRISMATIC LOCK AND KEY SECURITY

CROSS-REFERENCE TO RELATED APPLICATION

This application is a continuation application of and claims priority from U.S. patent application Ser. No. 12/247,700, filed on Oct. 8, 2008.

BACKGROUND OF THE INVENTION

1. Field of the Invention

The field of the invention is data processing, or, more specifically, methods and apparatus for lock and key security.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today are incorporated in some manner into many different devices and systems including, for example, televisions, telephones, security devices, global positioning satellite devices, and so on. Computer system technology for lock and key security, that is, security systems in which a lock is engaged and disengaged by a particular key, however, is currently lacking. A typical hardware-based key may be easily replicated for tampering with a lock and typical hardware-based locks are easily picked. Even some computer system based locks, such as those implemented in hotel chains, are capable of being 'hacked' or bypassed by one with sufficient knowledge of computer systems.

SUMMARY OF THE INVENTION

Methods and apparatus for lock and key security, the lock including a light receptacle, a scatter pattern detecting module, and a locking mechanism, the key including a light source and a prism, the lock and key security including receiving, in the light receptacle of the lock, light transmitted by the light source in the key through the prism; identifying, by the scatter pattern detecting module, a scatter pattern of the received light; comparing, by the scatter pattern detecting module, the scatter pattern to a unique preauthorized pattern for operating the lock; if the scatter pattern matches the unique preauthorized pattern, switching, by the scatter pattern detecting module, the current locking state of the locking mechanism; and if the scatter pattern does not match the unique preauthorized pattern, maintaining the current locking state of the locking mechanism.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
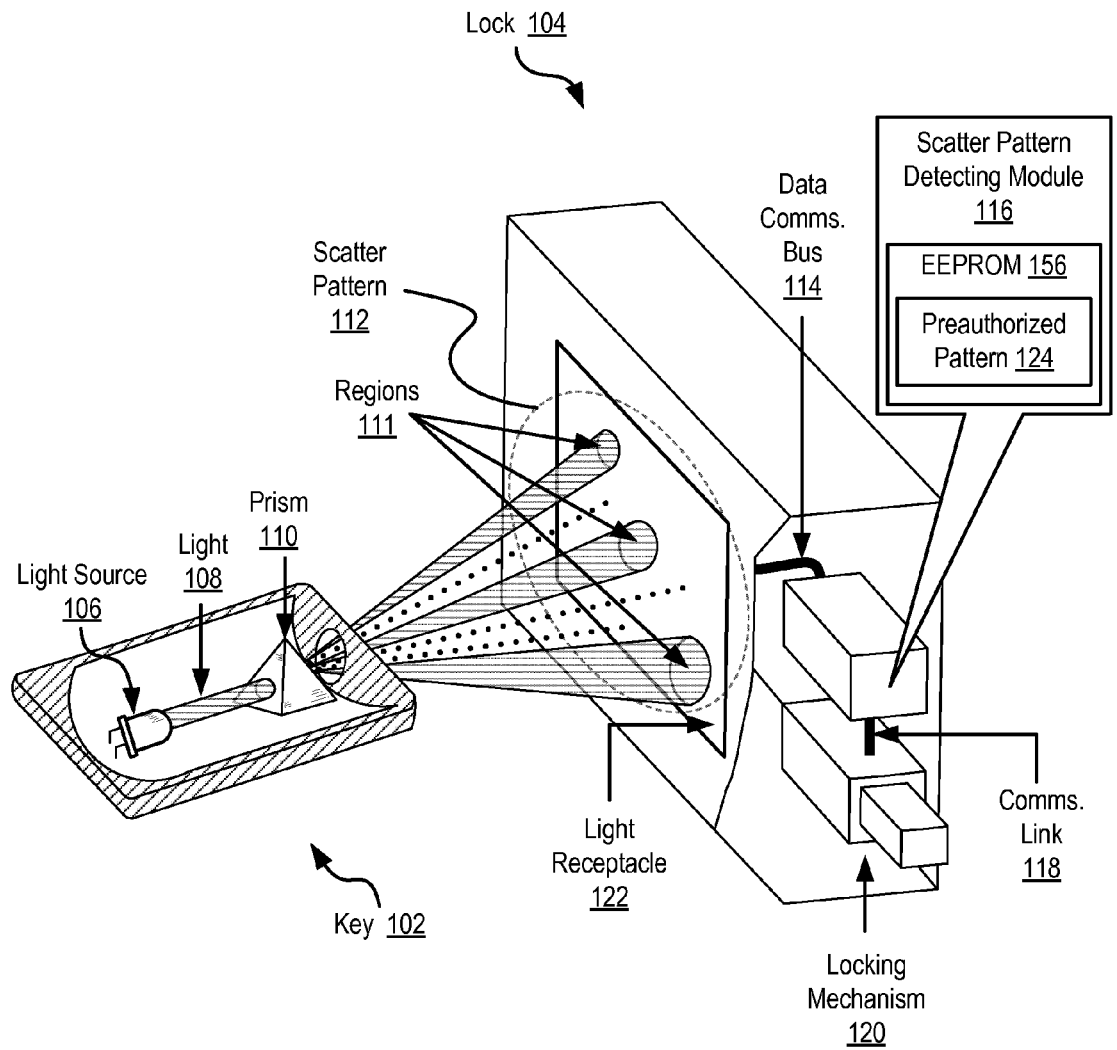
FIG. 1 sets forth a line drawing of an example system for lock and key security according to embodiments of the present invention.

Exemplary methods and apparatus for lock and key security in accordance with the present invention are described with reference to the accompanying drawings, beginning with FIG. 1. FIG. 1 sets forth a line drawing of an example system for lock and key security according to embodiments of the present invention. Lock and key security as the term is used in this specification refers to security mechanisms configured according to embodiments of the present invention in which a lock is operated with a key. That is, for lock and key security systems, a user may lock or unlock the security system by way of a key. Systems for lock and key security configured according to embodiments of the present invention may provide security for a variety of objects in a variety of applications including, for example, in doors of a building, windows, vaults, safes, cars, and in other applications as will occur to readers of skill in the art.

The system of FIG. 1 includes a key (102) capable of operating a lock (104). The key (102) in the example of FIG. 1 is depicted with a cutaway view such that the objects, devices, and mechanisms included in the key (102) are visible in FIG. 1. The example key (102) of FIG. 1 is a 'key' in the sense that it is capable of operating a lock (104). The example key (102) of FIG. 1 includes a prism (110) and a light source (106). A prism (110) is a transparent optical element that refracts light The prism (110) in the example of FIG. 1 is depicted as a triangular prism for clarity of explanation only, not for limitation. Readers of skill in the art will immediately recognize that a transparent optical element of any shape and any material that refracts light may be configured for lock and key security in accordance with embodiments of the present invention The example prism (110) of FIG. 1, for example, may be implemented with shattered glass where the shattered glass provides a unique scatter pattern when light (108) is transmitted through it.

A scatter pattern is a pattern of light produced when the light is transmitted through the prism and formed in dependence upon characteristics of the prism. That is, when light travels through the prism, characteristics of the prism cause the light to bend, refract, reflect, change speed, separate into bands of differing wavelengths, and so on as will occur to readers of skill in the art. Such characteristics of a prism that produces a scatter pattern of light may include the prism's flaws, shape, material composition, angles, and so on as will occur to readers of skill in the art.

A prism implemented with shattered glass may provide a 'unique' scatter pattern according to embodiments of the present invention with respect to other pieces of shattered glass. Characteristics of prisms which affect light and characteristics of scatter patterns are different between different pieces of shattered glass. As such, transmitting light from the same light source through two different pieces of shattered glass will produce two unique scatter patterns. When only one key produces a particular unique scatter pattern for which a lock is configured to operate, the possibility of tampering with the lock is reduced, as no other prism, or nearly no other prism, is capable of recreating the unique scatter pattern.

The example key (102) of FIG. 1 also includes a light source (108). The light source (106) in this example of FIG. 1 is configured to transmit light (108) through the prism (102) into a light receptacle (122) of a lock (104) in order to switch the locking state of a locking mechanism (120). The light source (106) may be any source of light capable of transmitting light through a prism in such a way as to produce a scatter pattern (112). The light source (106) in the example of FIG. 1 may be implemented as a visible-spectrum light source or a laser light source. Typical visible-spectrum light sources provide light consisting of multiple different wavelengths of light such that when the light is transmitted through a prism the multiple different wavelengths are separated in the resulting scatter pattern. Laser light by contrast is typically, but not always, a single wavelength that produces a scatter pattern of that single wavelength when transmitted through a prism.

Although the example key (102) of FIG. 1 includes only a light source (106) and prism (110), readers of skill in the art will immediately recognize that such keys configured for lock and key security according to embodiments of the present invention may include additional devices, objects, and circuitry, such as for example, one or more buttons for activating a light source (106) in the key (102), integrated circuits for controlling the operation of a light source (106) in the key, power sources for the light source, additional light sources, multiple different types of light sources in the key, additional prisms for multiple light sources, and others. Keys for lock and key security according to embodiments of the present invention may be implemented in any many ways, such as for example, in a pen light configuration or in a plastic key fob device similar to fobs used to operate common car alarm and locking systems. A key (102) according to embodiments of the present invention may be configured to operate a lock without contact between the lock and key other than the scatter pattern of light transmitted by the key. The key and light receptacle of the lock may alternatively be configured such that the key is inserted into the light receptacle of the locking mechanism fitted for such a purpose so as to insure a precise and accurate alignment of the scatter pattern transmitted by the key.

As mentioned above, the system of FIG. 1 also includes a lock (104). The example lock (104) in the system of FIG. 1 includes a locking mechanism (120), a light receptacle (122) and a scatter pattern detecting module (116). A locking mechanism is any aggregation of hardware and software capable of restricting access when engaged and enabling access when disengaged. Examples of locking mechanisms include a locking pin and actuator, a motor and deadbolt, an electromagnet and armature plate, and so on as will occur to readers of skill in the art.

A light receptacle (122) is an aggregation of computing hardware and software, configured to receive light (108) transmitted by the light source (106) in the key (102) through the prism (110). The example light receptacle (122) of FIG. 1 may be implemented as a charge-coupled device ('CCD'), a complementary metal-oxide-semiconductor ('CMOS') active-pixel sensor, or as another light-sensing device as will occur to readers of skill in the art. A CCD includes a photoactive region and an analog shift register, that enables analog signals, electric charges affected by light received in the photoactive region, to be transported through successive stages, capacitors, controlled by a clock signal. CCDs are most widely used for serializing parallel analog signals, namely in arrays of photoelectric light sensors. An active-pixel sensor is an image sensor consisting of an integrated circuit containing an array of pixel sensors, each pixel containing a photodetector and an active amplifier. A CMOS active-pixel sensor is an active-pixel sensor produced by a CMOS fabrication process. CMOS active-pixel sensors are common alternatives to CCDs in digital cameras. Readers of skill in the art will recognize that, in addition to CCDs and CMOS active pixel sensors, light receptacles configured for lock and key security in accordance with embodiments of the present invention may be implemented with any type of image sensor capable of receiving light transmitted by a light source through a prism of a key.

A scatter pattern detecting module (116) is an aggregation of computer hardware and software configured to operate generally for lock and key security according to embodiments of the present invention. The scatter pattern detecting module (116) may include one or more computer processors (not shown in FIG. 1) operatively coupled through a high speed memory bus to Random Access Memory ('RAM') (not shown in FIG. 1) and EEPROM (156) or so-called Flash RAM. The scatter pattern detecting module (116) of FIG. 1 is operatively coupled for data communications to the light receptacle through a data communications bus (114) and to the locking mechanism through a communications link (118). The data communications bus may be any high speed bus such as a Peripheral Component Interconnect ('PCI') bus, a PCI external ('PCIe') bus, a Small Computer System Interface ('SCSI') bus, a Universal Serial Bus (USW), and others that may occur to readers of skill in the art. The communications link (118) may be implemented as a data communications bus similar to that connecting the scatter pattern detecting module (116) to the light receptacle, or may be as on wire or two wire link, such as an Inter-Integrated Circuit ('I²C') link, capable of carrying current for activating a motor, an actuator, or some other electro mechanical device in the locking mechanism.

The scatter pattern detecting module (116) in the example of FIG. 1 operates generally for lock and key security according to embodiments of the present invention by identifying, by the scatter pattern detecting module (116), a scatter pattern (112) of the light received in the light receptacle (122) and comparing, by the scatter pattern detecting module (116), the scatter pattern (112) to a unique preauthorized pattern (124) for operating the lock (104). A preauthorized pattern (124) is a data structure that includes information specifying characteristics of a scatter pattern that is preauthorized to operate the lock (104). The scatter pattern detecting module (116) may compare the characteristics of the preauthorized pattern (124) to characteristics of the received scatter pattern (112) to determine whether the two patterns match. In some embodiments, for example, the scatter pattern detecting module may compare values of light intensity of regions (111) of the scatter pattern (112) with values of light intensity of corresponding regions of the preauthorized pattern (124). If the scatter pattern (112) matches the unique preauthorized pattern (124) the scatter pattern detecting module (116), switches the current locking state of the locking mechanism (120). That is, if the current locking state is 'locked,' the scatter pattern detecting module switches the locking state to 'unlocked,' disengaging the locking mechanism (120) and if the current locking state is 'unlocked,' the scatter pattern detecting module (116) switches the locking state to 'locked,' engaging the locking mechanism (120). If the scatter pattern (112) does not match the unique preauthorized pattern (124), however, the scatter pattern detecting module (116) maintains the current locking state of the locking mechanism.

Readers of skill in the art will recognize that in a lock and key security system configured according to embodiments of the present invention, such as the example lock and key security system of FIG. 1, a scatter pattern (112) may be represented in various forms electrically and in computer memory as data. When received by a light receptacle (122) of a lock (104), for example, a scatter pattern may be represented by a set of voltage levels or current levels in capacitors or photodetectors of a light sensor. When the scatter pattern is identified by the scatter pattern detecting module (116) it may be represented by a data structure, such as one or more tables, in non-volatile memory, such as Electrically Erasable Programmable Read-Only Memory ('EEPROM') (156).

The arrangement of light sources, prisms, light receptacles, locking mechanisms, scatter pattern detecting modules, and other devices and mechanisms making up the exemplary system illustrated in FIG. 1 are for explanation, not for limitation. Systems useful for lock and key security according to various embodiments of the present invention may include additional devices, light sources, prisms, computer hardware, DC motors, stepper motors, actuators, locking pins, deadbolts, light sensors, and so on, not shown in FIG. 1, as will occur to those of skill in the art. Various embodiments of the present invention may be implemented on a variety of hardware platforms in addition to those illustrated in FIG. 1.

Figure 2:
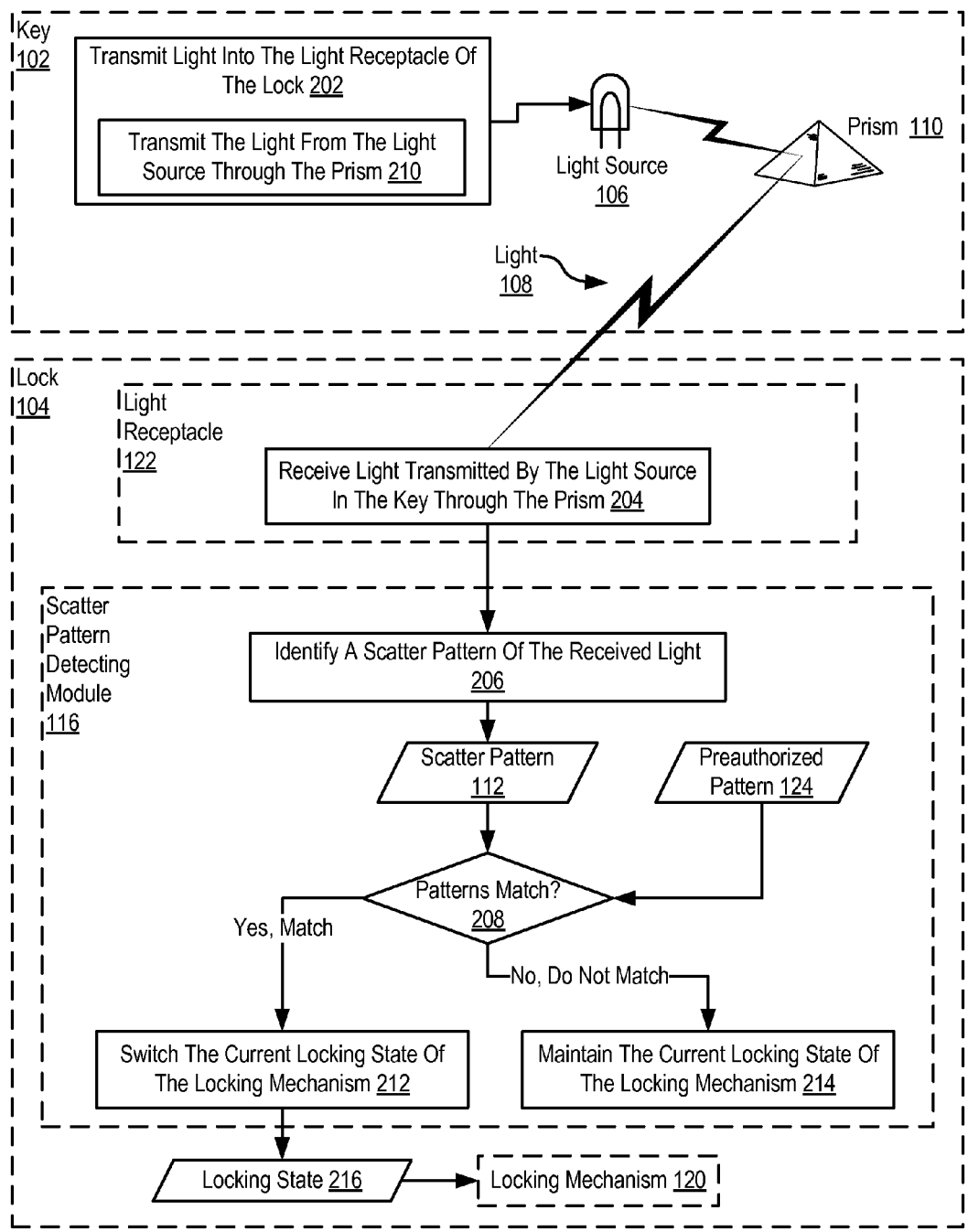
FIG. 2 sets forth a flow chart illustrating an exemplary method for lock and key security according to embodiments of the present invention.

For further explanation, FIG. 2 sets forth a flow chart illustrating an exemplary method for lock and key security according to embodiments of the present invention. The lock (104) in the example of FIG. 2 includes a light receptacle (122), a scatter pattern detecting module (116), and a locking mechanism (120), and the key (102) in the example of FIG. 2 includes a light source (106) and a prism (110). The method of FIG. 2 includes transmitting (202) by the key (102) light (108) into the light receptacle (122) of the lock (104). In the method of FIG. 2, transmitting (202) by the key (102) light (108) into the light receptacle (122) of the lock (104) is carried out by transmitting (210) the light (108) from the light source (106) through the prism (110). As mentioned above, the light source (106) may be implemented as a laser light source of a single wavelength, a visible-spectrum light source of multiple wavelengths, or some other light source as may occur to readers of skill in the art, such as an infrared light source and the like. Also as mentioned above, the prism (110) in the example of FIG. 2 may be implemented with shattered glass. Such a prism implemented with shattered glass provides a unique scatter pattern, unique with respect to other prisms of shattered glass, when light is transmitted through the prism.

The method of FIG. 2 also includes Receiving (204), in the light receptacle (122) of the lock (104), light (108) transmitted by the light source (106) in the key (102) through the prism (110). Receiving (204), in the light receptacle (122) of the lock (104), light (108) transmitted by the light source (106) in the key (102) through the prism (110). As mentioned above with respect to FIG. 1, the light receptacle (122) may be implemented with a CCD, a CMOS active-pixel sensor, another type of active-pixel sensor, or any other image sensor as may occur to readers of skill in the art.

The method of FIG. 2 also includes identifying (206), by the scatter pattern detecting module (116), a scatter pattern (112) of the received light (108). Identifying (206), by the scatter pattern detecting module (116), a scatter pattern (112) of the received light (108) may be carried out in various ways including for example, detecting values of light intensity greater than predetermined threshold, locations of the light having such values of light intensity, and wavelengths of the light received in the light receptacle at the locations.

The method of FIG. 2 also includes comparing (208), by the scatter pattern detecting module (116), the scatter pattern (112) to a unique preauthorized pattern (124) for operating the lock (104). If the scatter pattern (112) matches the unique preauthorized pattern (124), the method of FIG. 2 continues by switching (212), by the scatter pattern detecting module (116), the current locking state (216) of the locking mechanism (120). Switching (212) the current locking state (216) of the locking mechanism (120) may be carried out in various was in dependence upon the implementation of the locking mechanism. When the locking mechanism (120) is implemented as a deadbolt engaged by an actuator, for example, the scatter pattern detecting module (116) may switch the current locking state (216) by alternating the voltage level, from a logic high to low or low to high, of a signal wire connecting the scatter pattern detecting module (116) to the locking mechanism (120). When the locking mechanism (120) is implemented as an electromagnet locking mechanism with an armature plate, the scatter pattern detecting module may switch (212) the current locking state of the locking mechanism (120) by sending a data communications message to microcontroller for the electromagnet locking mechanism instructing the microcontroller to switch the current locking state. These are but two examples described here for clarity of explanation only, not limitation. Readers of skill in the art will recognize that there are many different ways to carry out switching the current locking state of a locking mechanism (120) in accordance with embodiments of the present invention, as many in fact as there are implementations of the locking mechanism itself, and each such way is well within the scope of the present invention. If the scatter pattern (112) does not match the unique preauthorized pattern (124), the method of FIG. 2 continues by maintaining (214) the current locking state of the locking mechanism (120), that is, by not switching the current locking state (216) of the locking mechanism (120).

Figure 3:
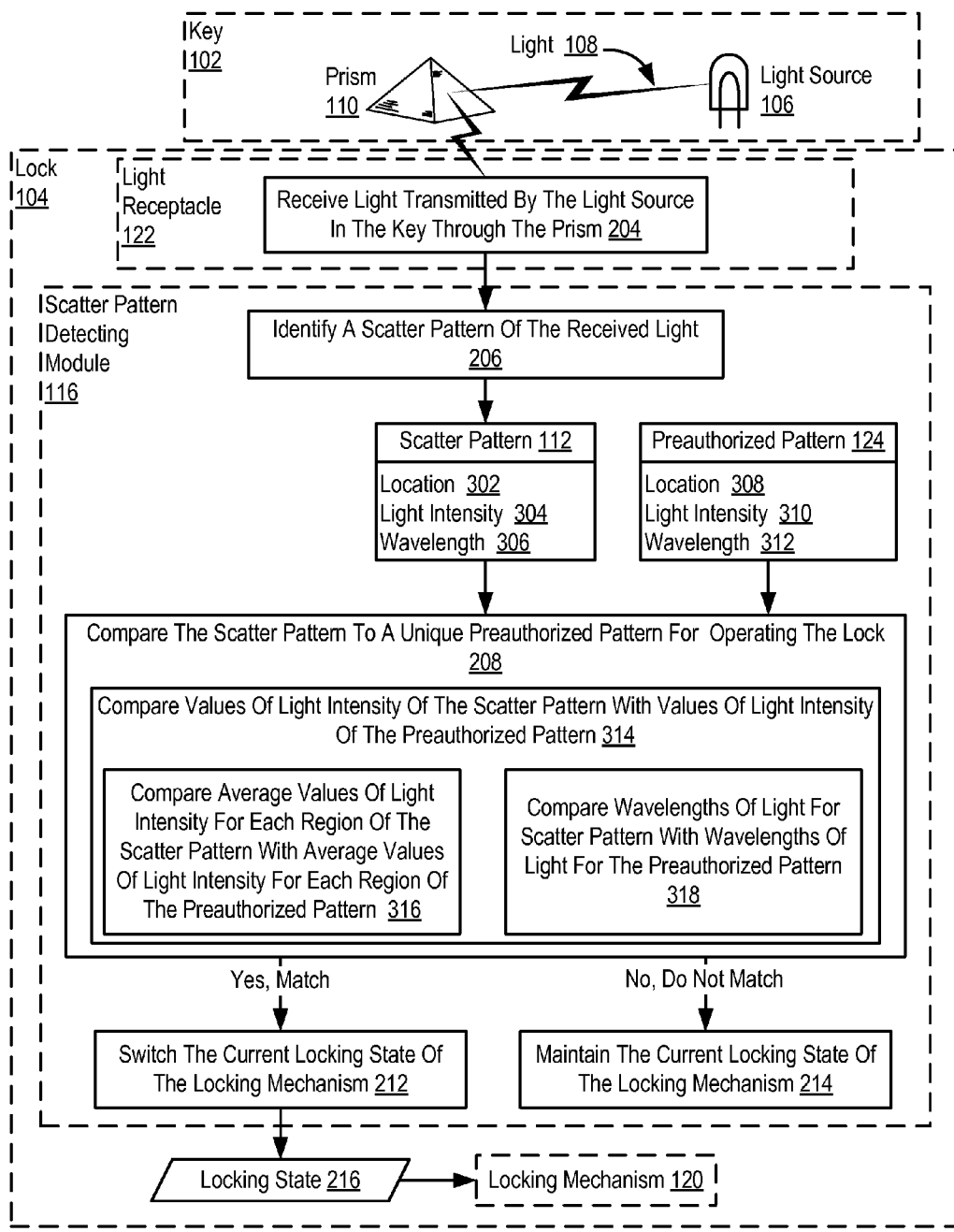
FIG. 3 sets forth a flow chart illustrating a further exemplary method for lock and key security according to embodiments of the present invention.

For further explanation, FIG. 3 sets forth a flow chart illustrating a further exemplary method for lock and key security according to embodiments of the present invention. The method of FIG. 3 is similar to the method of FIG. 2, including as it does, receiving (204) light (108) transmitted by the light source (106) in the key (102) through the prism (110); identifying (206) a scatter pattern (112) of the received light (108); comparing (208) the scatter pattern (112) to a unique preauthorized pattern (124) for operating the lock (104); if the scatter pattern (112) matches the unique preauthorized pattern (124), switching (212) the current locking state (216) of the locking mechanism (120); and if the scatter pattern (112) does not match the unique preauthorized pattern (124), maintaining (214) the current locking state of the locking mechanism (120).

The method of FIG. 3 differs from the method of FIG. 2, however, in that, in the method of FIG. 3 comparing (208) the scatter pattern (112) to a unique preauthorized pattern (124) for operating the lock (104) includes comparing (314) values of light intensity (304) of the scatter pattern (112) with values of light intensity (310) of the preauthorized pattern (124). Comparing (314) values of light intensity (304) for the scatter pattern (112) with values of light intensity (310) the preauthorized pattern (124) may be carried out in various ways. In the method of FIG. 3, for example, comparing (314) values of light intensity (304) for the scatter pattern (112) with values of light intensity (310) the preauthorized pattern (124) may be carried out by comparing (316) average values of light intensity (304) for particular regions of the scatter pattern (112) with average values of light intensity (310) for particular regions of the preauthorized pattern (124) where the regions of the scatter pattern (112) correspond in location (302, 308) to the regions of the preauthorized pattern (124). Also in the method of FIG. 3 comparing (314) values of light intensity (304) for the scatter pattern (112) with values of light intensity (310) for the preauthorized pattern (124) may include comparing (318) wavelengths of light (306) for the scatter pattern (112) with wavelengths (312) of light for the preauthorized pattern (124). That is, in addition to comparing values of light intensity, the scatter pattern detecting module may also compare wavelengths of the scatter patterns. Readers of skill in the art will recognize that these example ways of comparing (208) the scatter pattern to a unique preauthorized pattern for operating the lock (104) are several among many possible ways and each such way of comparing scatter patterns is well within the scope of the present invention.

Figure 4:
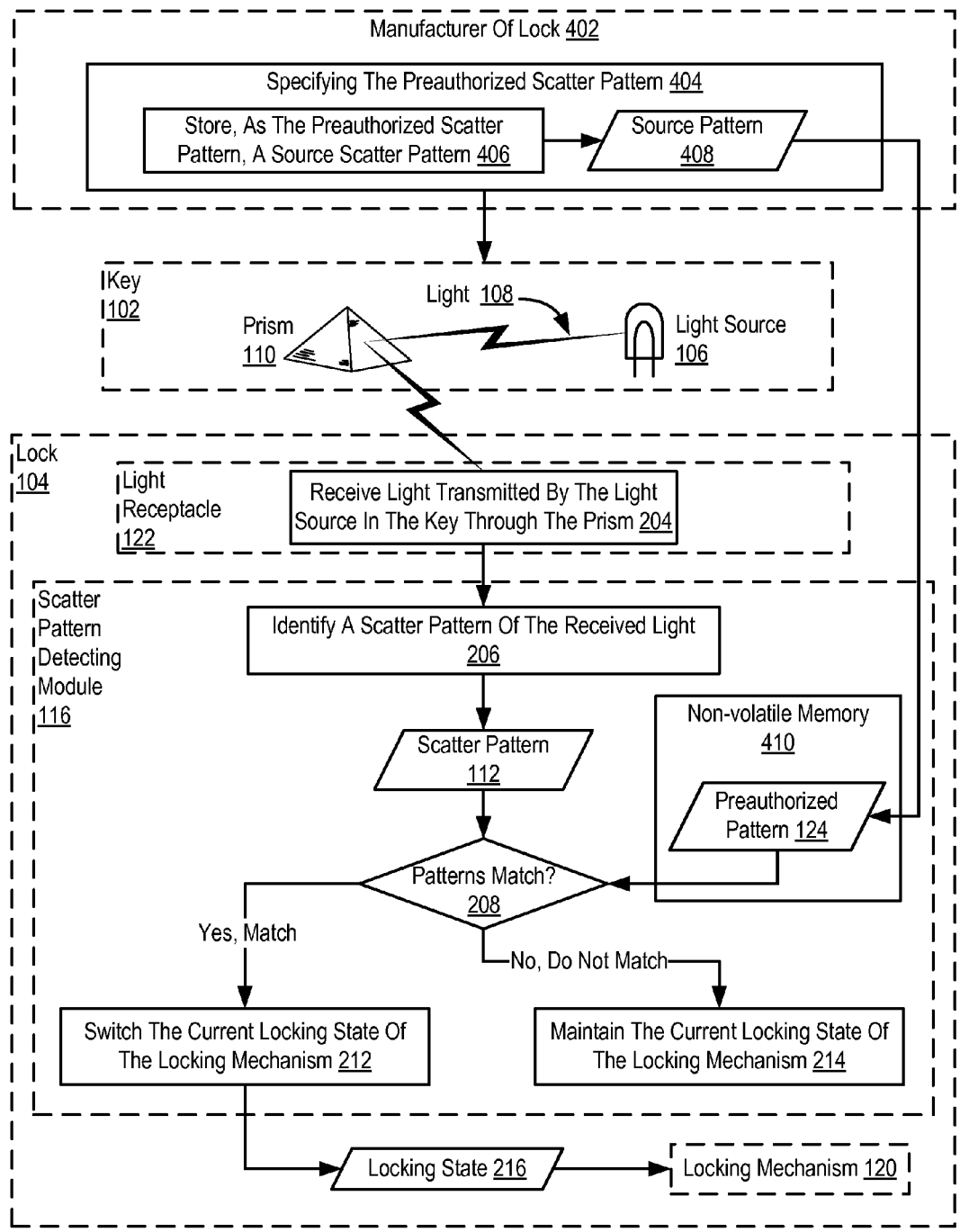
FIG. 4 sets forth a flow chart illustrating a further exemplary method for lock and key security according to embodiments of the present invention.

For further explanation, FIG. 4 sets forth a flow chart illustrating a further exemplary method for lock and key security according to embodiments of the present invention. The method of FIG. 4 is similar to the method of FIG. 2, including as it does, receiving (204) light (108) transmitted by the light source (106) in the key (102) through the prism (110); identifying (206) a scatter pattern (112) of the received light (108); comparing (208) the scatter pattern (112) to a unique preauthorized pattern (124) for operating the lock (104); if the scatter pattern (112) matches the unique preauthorized pattern (124), switching (212) the current locking state (216) of the locking mechanism (120); and if the scatter pattern (112) does not match the unique preauthorized pattern (124), maintaining (214) the current locking state of the locking mechanism (120).

The method of FIG. 4 differs from the method of FIG. 2, however, in that the method of FIG. 4 includes specifying (404) by a manufacturer (402) of the lock (104), the unique preauthorized scatter pattern (124). A 'manufacturer' as the term is used here refers to a business, company, group, agents of such businesses, companies, and groups, and any individual capable of assembling, selling, testing, programming, constructing, or producing the lock (104). A manufacturer may also include a vendor of the lock. In the method of FIG. 2, specifying the unique preauthorized scatter pattern (124) includes storing (406), in non-volatile computer memory (410) of the scatter pattern detecting module (116) as the preauthorized scatter pattern (124), a source scatter pattern (408) identified by the scatter pattern detecting module (116) in dependence upon light (108) received in the light receptacle (122) where the light (108) is light transmitted by the light source (106) in the key (102) through the prism (110) at the behest of the manufacturer (402). A source scatter pattern (408) as the term is used here is a scatter pattern produced by a key authorized to operate the lock. The manufacturer (402) of the lock, may select any key (102) as such an authorized key, use that selected key to transmit light through the prism (110) of the key into the light receptacle (122) producing a source scatter pattern, and store that source scatter pattern as the unique preauthorized scatter pattern (124). The manufacturer may store the source pattern in non-volatile memory (410) of the scatter pattern detecting module (116) such as Electrically Erasable Programmable Read-Only Memory ('EEPROM').

In view of the explanations set forth above, readers will recognize that at least one benefit of lock and key security according to embodiments of the present invention includes reducing the risks of lock tampering by providing a key which is difficult, if not impossible, to recreate, copy, or mimic. Specifically keys configured according to embodiments of the present invention with a prism of shattered glass provide increased security compared to lock and key systems of the prior art as no other prism, or nearly no other prism, of shattered glass is capable of producing the same unique scatter pattern produced by the key.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   receiving, in a light receptacle of a lock, light transmitted by a light source through shattered glass forming a prism in a key, wherein the transmission of the light through the shattered glass forms a unique scatter pattern in dependence upon physical characteristics of the shattered glass;
   identifying the scatter pattern of the received light; and
   comparing the scatter pattern to a unique preauthorized pattern for operating the lock.

2. The method of claim 1 wherein comparing the scatter pattern to a unique preauthorized pattern for operating the lock further comprises:
   comparing values of light intensity of the scatter pattern with values of light intensity of the preauthorized pattern.

3. The method of claim 2 wherein comparing values of light intensity for the scatter pattern with values of light intensity the preauthorized pattern further comprises:
   comparing average values of light intensity for each of a plurality of regions of the scatter pattern with average values of light intensity for each of a plurality of regions of the preauthorized pattern, the plurality of regions of the scatter pattern corresponding in location to the plurality of regions of the preauthorized pattern.

4. The method of claim 2 wherein comparing values of light intensity for the scatter pattern with values of light intensity for the preauthorized pattern further comprises:
   comparing wavelengths of light for the scatter pattern with wavelengths of light for the preauthorized pattern.

5. The method of claim 1 wherein the light source comprises a laser light source.

6. The method of claim 1 wherein the light source comprises a visible-spectrum light source.

7. The method of claim 1 further comprising specifying by a manufacturer of the lock, the unique preauthorized scatter pattern including:
   transmitting toward the lock, at the behest of the manufacturer, light by the light source in the key through the shattered glass forming the prism thereby generating a source scatter pattern;
   identifying, by the scatter pattern detecting module of the lock, the source scatter pattern; and
   storing the source scatter pattern as the preauthorized scatter pattern in non-volatile computer memory of the scatter pattern detecting module.

8. An apparatus comprising:
   a key comprising a light source and shattered glass forming a prism; and
   a lock comprising:
      a locking mechanism;
      a light receptacle configured to receive light transmitted by the light source in the key through the shattered glass forming the prism, wherein the transmission of the light through the shattered glass forms a unique scatter pattern in dependence upon physical characteristics of the shattered glass;

a scatter pattern detecting module operatively coupled for data communications to the light receptacle and the locking mechanism, the scatter pattern detecting module configured to:

identify the scatter pattern of the received light transmitted by the light source in the key through the shattered glass forming the prism; and compare the scatter pattern to a unique preauthorized pattern for operating the lock.

9. The apparatus of claim 8 wherein the light receptacle further comprises a charge-coupled device ('CCD').

10. The apparatus of claim 8 wherein the light receptacle further comprises a complementary metal-oxide-semiconductor ('CMOS') active-pixel sensor.

11. An apparatus comprising a lock and a key, the lock comprising a light receptacle, a scatter pattern detecting module, and a locking mechanism, the key comprising a light source and shattered glass forming a prism, the apparatus further comprising a computer processor and a computer memory operatively coupled to the computer processor, the computer memory having disposed within it computer program instructions that when executed by the computer processor cause the apparatus to carry out the steps of:

receiving, in the light receptacle of the lock, light transmitted by the light source in the key through the shattered glass forming the prism, wherein the transmission of the light through the shattered glass forms a unique scatter pattern in dependence upon physical characteristics of the shattered glass;

identifying, by the scatter pattern detecting module, the scatter pattern of the received light; and comparing, by the scatter pattern detecting module, the scatter pattern to a unique preauthorized pattern for operating the lock.

12. The apparatus of claim 11 wherein the light source comprises a laser light source.

13. The apparatus of claim 11 wherein the light source comprises a visible-spectrum light source.

\* \* \* \* \*